US012566882B2

(12) United States Patent
Park et al.

(10) Patent No.: US 12,566,882 B2
(45) Date of Patent: Mar. 3, 2026

(54) BIG DATA ANALYSIS DEVICE FOR PREVENTING PERSONAL INFORMATION INFRINGEMENT, METHOD FOR OPERATING SAME, AND NON-TRANSITORY COMPUTER READABLE STORAGE MEDIUM

(71) Applicant: Samsung Electronics Co., Ltd., Suwon-si (KR)

(72) Inventors: Jaeseok Park, Suwon-si (KR); Junggeun Kim, Suwon-si (KR); Donggeon Park, Suwon-si (KR); Minkyu Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 68 days.

(21) Appl. No.: 18/599,872

(22) Filed: Mar. 8, 2024

(65) Prior Publication Data

US 2024/0211622 A1      Jun. 27, 2024

Related U.S. Application Data

(63) Continuation of application No. PCT/KR2022/015745, filed on Oct. 17, 2022.

(30) Foreign Application Priority Data

Dec. 6, 2021      (KR) ......................... 10-2021-0173322
Dec. 24, 2021      (KR) ......................... 10-2021-0187449

(51) Int. Cl.
*G06F 21/62*            (2013.01)

(52) U.S. Cl.
CPC ...... *G06F 21/6227* (2013.01); *G06F 21/6245* (2013.01)

(58) Field of Classification Search
None
See application file for complete search history.

(56) References Cited

U.S. PATENT DOCUMENTS 9,195,744 B2      11/2015  Adachi et al.
9,715,596 B2       7/2017  Woss et al.
(Continued)

FOREIGN PATENT DOCUMENTS

CN            111832068 A      10/2020
KR      10-2006-0085908 A       7/2006
(Continued)

OTHER PUBLICATIONS

International Search Report dated Jan. 13, 2023, issued in International Patent Application No. PCT/KR2022/015745.

*Primary Examiner* — William J. Goodchild
(74) *Attorney, Agent, or Firm* — Jefferson IP Law, LLP

(57) ABSTRACT

A method of operating a big data analysis device is provided. The method includes receiving a user query, decomposing the received user query into multiple subqueries, identifying first subqueries configured to refer to personal information among the multiple subqueries, reconfiguring the first subqueries into second subqueries independent of the personal information based on a component accessible to the personal information, and generating a reconfigured query by merging the second subqueries with subqueries other than the first subqueries configured to refer to the personal information among the multiple subqueries.

18 Claims, 7 Drawing Sheets

(56)  References Cited

U.S. PATENT DOCUMENTS

| | | | |
|---|---|---|---|
| 9,934,395 | B2 | 4/2018 | Paulovicks et al. |
| 10,482,082 | B2 | 11/2019 | Seo et al. |
| 10,628,608 | B2 | 4/2020 | Hebert et al. |
| 10,963,518 | B2 | 3/2021 | Aggour et al. |
| 11,314,895 | B2 | 4/2022 | Torbey |
| 2006/0167842 | A1 | 7/2006 | Watson |
| 2010/0023509 | A1* | 1/2010 | Adachi ............. G06F 16/24534 707/E17.014 |
| 2014/0130175 | A1 | 5/2014 | Ramakrishnan |
| 2017/0329873 | A1 | 11/2017 | Eide et al. |
| 2020/0090003 | A1 | 3/2020 | Marques et al. |
| 2020/0302080 | A1* | 9/2020 | Strahan ............. G06F 16/24542 |
| 2021/0049294 | A1 | 2/2021 | Nam et al. |

FOREIGN PATENT DOCUMENTS

| | | | |
|---|---|---|---|
| KR | 10-2016-0127581 | A | 11/2016 |
| KR | 10-1863268 | B1 | 5/2018 |
| KR | 10-2149900 | A | 8/2020 |
| KR | 10-2020-0103542 | A | 9/2020 |
| KR | 10-2020-0133927 | A | 12/2020 |
| WO | 2015/063905 | A1 | 5/2015 |
| WO | 2018/080857 | A1 | 5/2018 |
| WO | 2021/230968 | A1 | 11/2021 |

* cited by examiner

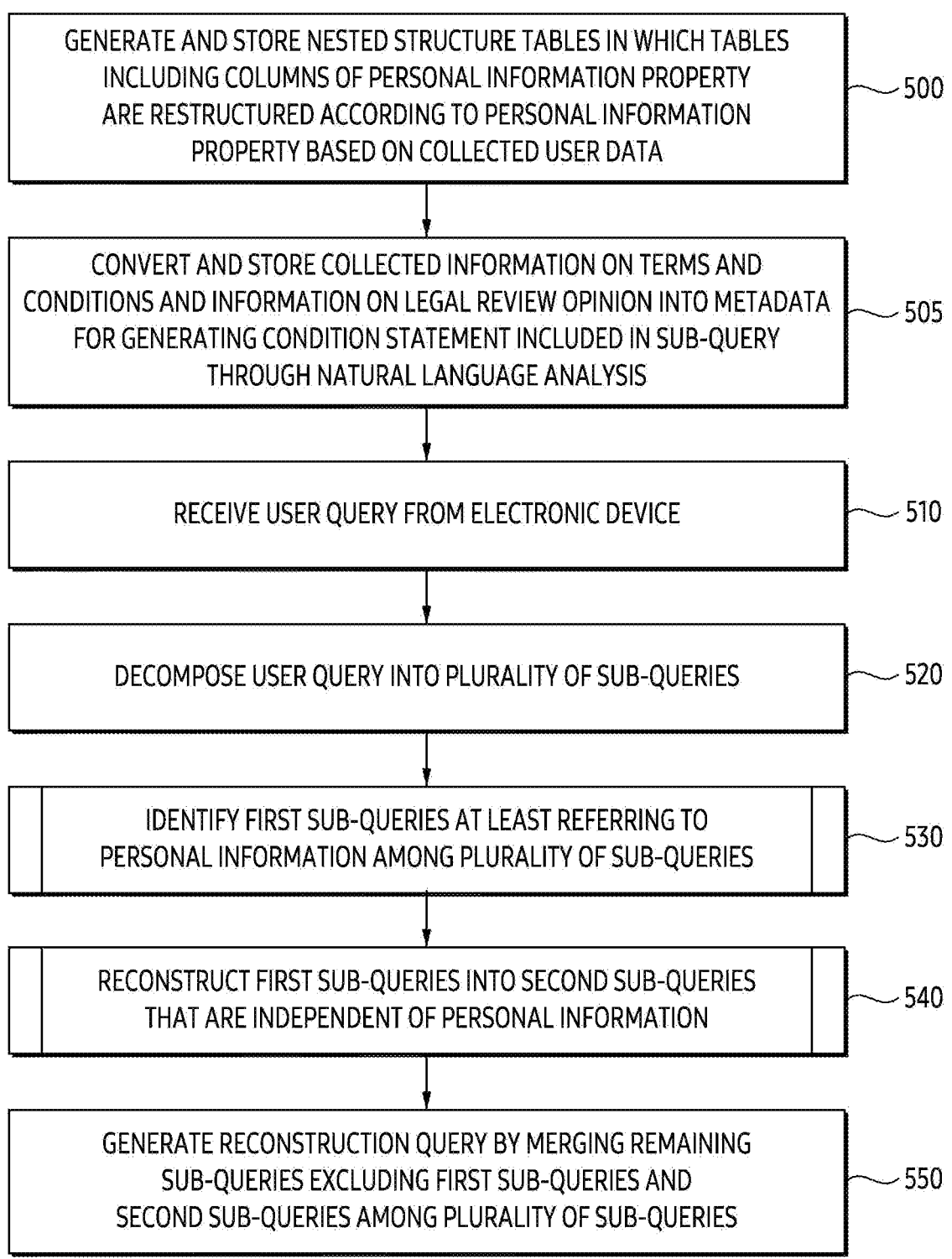

GENERATE AND STORE NESTED STRUCTURE TABLES IN WHICH TABLES INCLUDING COLUMNS OF PERSONAL INFORMATION PROPERTY ARE RESTRUCTURED ACCORDING TO PERSONAL INFORMATION PROPERTY BASED ON COLLECTED USER DATA — 500

CONVERT AND STORE COLLECTED INFORMATION ON TERMS AND CONDITIONS AND INFORMATION ON LEGAL REVIEW OPINION INTO METADATA FOR GENERATING CONDITION STATEMENT INCLUDED IN SUB-QUERY THROUGH NATURAL LANGUAGE ANALYSIS — 505

RECEIVE USER QUERY FROM ELECTRONIC DEVICE — 510

DECOMPOSE USER QUERY INTO PLURALITY OF SUB-QUERIES — 520

IDENTIFY FIRST SUB-QUERIES AT LEAST REFERRING TO PERSONAL INFORMATION AMONG PLURALITY OF SUB-QUERIES — 530

RECONSTRUCT FIRST SUB-QUERIES INTO SECOND SUB-QUERIES THAT ARE INDEPENDENT OF PERSONAL INFORMATION — 540

GENERATE RECONSTRUCTION QUERY BY MERGING REMAINING SUB-QUERIES EXCLUDING FIRST SUB-QUERIES AND SECOND SUB-QUERIES AMONG PLURALITY OF SUB-QUERIES — 550

FIG. 5

OBTAIN METADATA FROM PN STORAGE AND UR STORAGE
OF DATABASE STORAGE DEVICE                                   ~ 610

OBTAIN FILTERING SUB-QUERIES CORRESPONDING TO OBTAINED
METADATA BASED ON NATURAL LANGUAGE INTERPRETATION MODULE      ~ 620

GENERATE FINAL QUERY BY MERGING FILTERING SUB-QUERIES TO
RECONSTRUCTION QUERY                                          ~ 630

OBTAIN QUERY RESULTS FOR USER QUERY BY
SUBMITTING FINAL QUERY TO QUERY ENGINE                        ~ 640

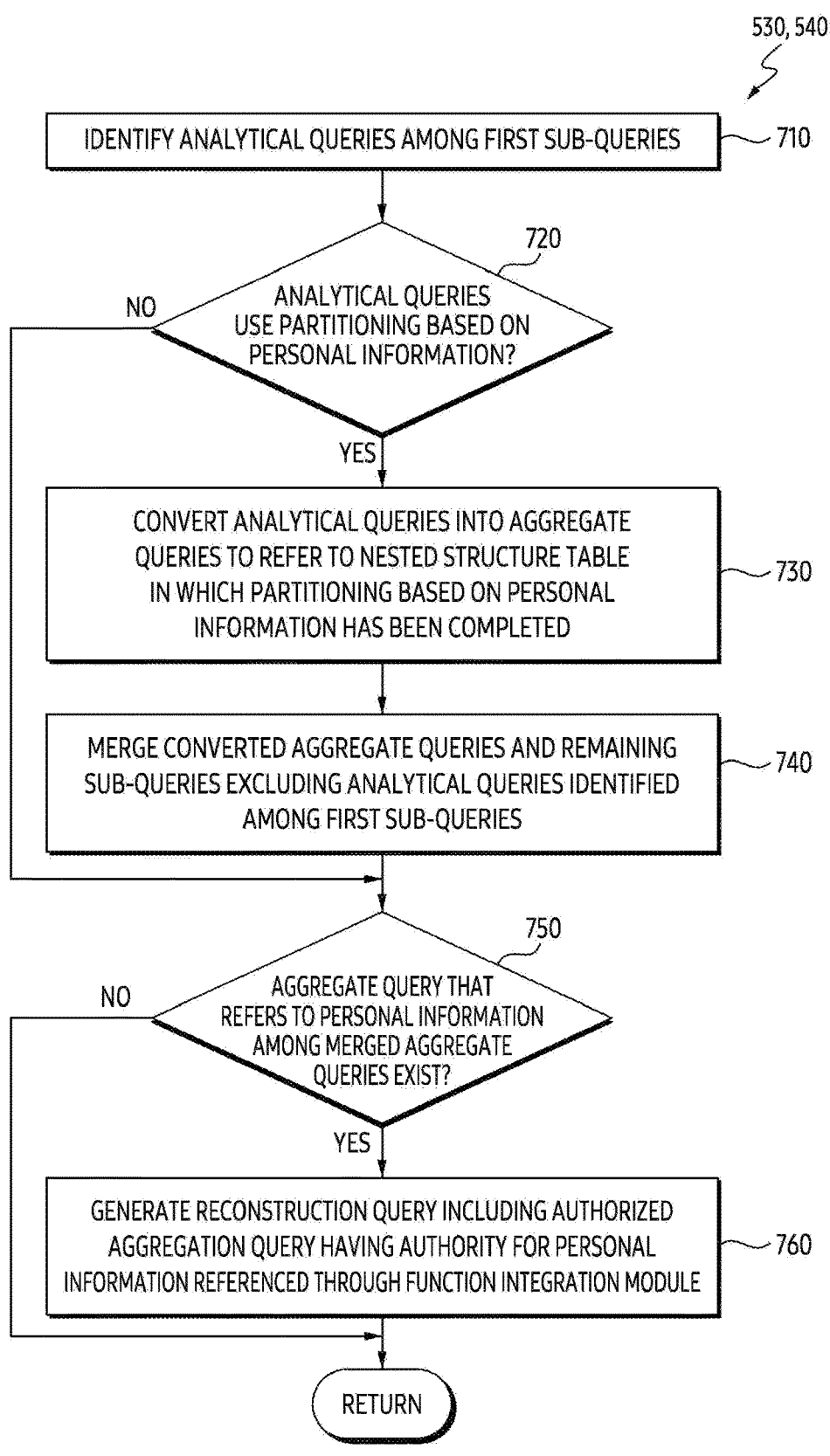

530,540

IDENTIFY ANALYTICAL QUERIES AMONG FIRST SUB-QUERIES — 710

ANALYTICAL QUERIES USE PARTITIONING BASED ON PERSONAL INFORMATION? — 720

NO

YES

CONVERT ANALYTICAL QUERIES INTO AGGREGATE QUERIES TO REFER TO NESTED STRUCTURE TABLE IN WHICH PARTITIONING BASED ON PERSONAL INFORMATION HAS BEEN COMPLETED — 730

MERGE CONVERTED AGGREGATE QUERIES AND REMAINING SUB-QUERIES EXCLUDING ANALYTICAL QUERIES IDENTIFIED AMONG FIRST SUB-QUERIES — 740

AGGREGATE QUERY THAT REFERS TO PERSONAL INFORMATION AMONG MERGED AGGREGATE QUERIES EXIST? — 750

NO

YES

GENERATE RECONSTRUCTION QUERY INCLUDING AUTHORIZED AGGREGATION QUERY HAVING AUTHORITY FOR PERSONAL INFORMATION REFERENCED THROUGH FUNCTION INTEGRATION MODULE — 760

RETURN

FIG. 7

BIG DATA ANALYSIS DEVICE FOR PREVENTING PERSONAL INFORMATION INFRINGEMENT, METHOD FOR OPERATING SAME, AND NON-TRANSITORY COMPUTER READABLE STORAGE MEDIUM

CROSS-REFERENCE TO RELATED APPLICATION(S)

This application is a continuation application, claiming priority under § 365(c), of an International application No. PCT/KR2022/015745, filed on Oct. 17, 2022, which is based on and claims the benefit of a Korean patent application number 10-2021-0173322, filed on Dec. 6, 2021, in the Korean Intellectual Property Office, and of a Korean patent application number 10-2021-0187449, filed on Dec. 24, 2021, in the Korean Intellectual Property Office, the disclosure of each of which is incorporated by reference herein in its entirety.

BACKGROUND

1. Field

The disclosure relates to a big data analysis device for preventing personal information infringement, a method for operating the same, and a non-transitory computer readable storage medium.

2. Description of Related Art

An online activity of users is increasing day by day on a contactless service including online to offline (O2O) and metaverse. With the increased online activity, vast amounts of personal information is being collected through a cloud environment.

Meanwhile, in order to resolve concerns about leakage, misuse, and illegal distribution of collected personal information, an effort to strengthen a regulation on personal information is intensifying by country. For example, Korea has enacted three data laws (Personal Information Protection Act, Information and Communication Network Act, and Credit Information Act), European Union has enacted general data protection regulation (GDPR), the United States has enacted California customer privacy act (CCPA), and thus regulations for the protection of personal information are in operation across different countries.

The above information is presented as background information only to assist with an understanding of the disclosure. No determination has been made, and no assertion is made, as to whether any of the above might be applicable as prior art with regard to the disclosure.

SUMMARY

In a network-separated environment with a legally enforced level of personal information protection device, a user who is a subject of a platform that analyzes big data on users cannot be provided with an interactive analysis interface that includes various functions. Accordingly, use of a platform including a big data analysis device has become estranged, and it is hindering establishment of a data-based organizational culture. The network-separated environment is adversely affecting productivity by fundamentally blocking use of various functions for user data analysis, making it difficult to find user insights or making data analysis a time-consuming task.

In addition, in order to combine and analyze data collected from various services used by the user, efforts to be well informed of terms and conditions and legal review contents of each service and reflect them in a data analysis logic are required. However, considering frequent law revisions to strengthen personal information protection, it takes a lot of cost and time for users to create a data analysis logic that fully complies with the personal information protection, and it is not easy to verify this, so there is a disadvantage in that there is also a risk of personal information protection infringement.

Aspects of the disclosure are to address at least the above-mentioned problems and/or disadvantages and to provide at least the advantages described below. Accordingly, an aspect of the disclosure is to provide a big data analysis device for preventing personal information infringement, a method for operating the same, and a non-transitory computer readable storage medium.

Additional aspects will be set forth in part in the description which follows and, in part, will be apparent from the description, or may be learned by practice of the presented embodiments.

In accordance with an aspect of the disclosure, a method for operating a bigdata analysis device is provided. The method includes receiving a user query, decomposing the received user query to a plurality of sub-queries, identifying first sub-queries configured to refer to personal information among the plurality of sub-queries, based on a component accessible to the personal information, reconstructing the first sub-queries into second sub-queries independent of the personal information, and generating a reconstruction query by merging the second sub-queries and remaining sub-queries excluding the first sub-queries configured to refer to the personal information among the plurality of sub-queries.

In accordance with another aspect of the disclosure, a bigdata analysis device is provided. The bigdata analysis device includes a query interface to receive user input, query reconstruction module to decompose a query into sub-queries or merge sub-queries, a query engine for performing operations on requested queries and outputting result data, and natural language interpretation module that generates filtering conditions to be used in sub-queries. The bigdata analysis device is configured to receive, through the query interface, a user query, decompose the received user query to a plurality of sub-queries, identify, through the query reconstruction module, first sub-queries configured to refer to personal information among the plurality of sub-queries, based on a component accessible to the personal information, reconstruct, through the query reconstruction module, the first sub-queries into second sub-queries independent of the personal information, and generate, through the query reconstruction module, a reconstruction query by merging the second sub-queries and remaining sub-queries excluding the first sub-queries configured to refer to the personal information among the plurality of sub-queries.

In accordance with another aspect of the disclosure, one or more non-transitory computer readable storage media storing computer-executable instructions that, when executed by one or more processors of an electronic device, cause the electronic device to perform operations are provided. The operations include receiving, through a query interface, a user query, decomposing, through a query reconstruction module, the received user query to a plurality of sub-queries, and identifying, through the query reconstruction module, first sub-queries configured to refer to personal information among the plurality of sub-queries, based on a component accessible to the personal information, reconstructing, through the query reconstruction module, the first sub-queries into second sub-queries independent of the personal information, and generating, through the query reconstruction module, a reconstruction query by merging the second sub-queries and remaining sub-queries excluding the first sub-queries configured to refer to the personal information among the plurality of sub-queries.

A big data analysis device, a method for operating, and a non-transitory computer readable storage medium according to an embodiment of the disclosure, that is robust against a personal information protection violation can allow to perform efficient analysis without concerns of infringement on personal information of the user, by improving existing platforms that have limitations in use from the perspective of security and personal information protection. Accordingly, it can provide a solution for responding to rapidly changing market conditions by increasing analysis productivity for vast amounts of personal information and enabling rapid data-based decision-making.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 5 is a flowchart illustrating a method for operating a bigdata analysis device according to an embodiment of the disclosure;

FIG. 7 is a flowchart illustrating a method for operating query reconstruction module reconstructing second sub-queries according to an embodiment of the disclosure.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

It should be appreciated that the blocks in each flowchart and combinations of the flowcharts may be performed by one or more computer programs which include computer-executable instructions. The entirety of the one or more computer programs may be stored in a single memory device or the one or more computer programs may be divided with different portions stored in different multiple memory devices.

Any of the functions or operations described herein can be processed by one processor or a combination of processors. The one processor or the combination of processors is circuitry performing processing and includes circuitry like an application processor (AP, e.g., a central processing unit (CPU)), a communication processor (CP, e.g., a modem), a graphical processing unit (GPU), a neural processing unit (NPU) (e.g., an artificial intelligence (AI) chip), a wireless-fidelity (Wi-Fi) chip, a Bluetooth™ chip, a global positioning system (GPS) chip, a near field communication (NFC) chip, connectivity chips, a sensor controller, a touch controller, a finger-print sensor controller, a display drive integrated circuit (IC), an audio CODEC chip, a universal serial bus (USB) controller, a camera controller, an image processing IC, a microprocessor unit (MPU), a system on chip (SoC), an IC, or the like.

Figure 1:
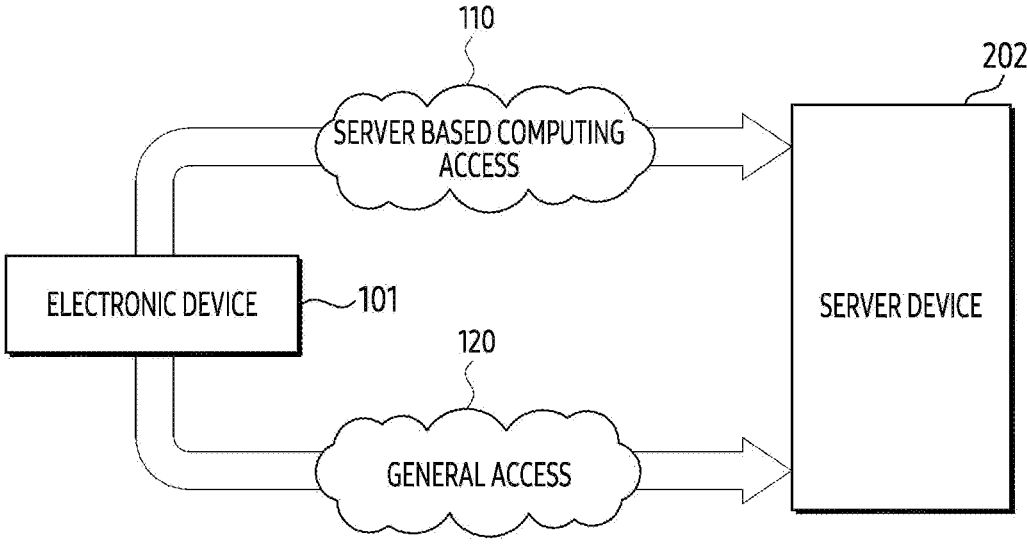
FIG. 1 is a block diagram of an electronic device in a network environment according to an embodiment of the disclosure.

FIG. 1 illustrates an electronic device in a network environment according to an embodiment of the disclosure.

Referring to FIG. 1, an electronic device 101 may access a server device 202 in a network environment 100. For example, the electronic device 101 may request access to the server device 202 to perform data analysis using user data stored in a database.

According to an embodiment of the disclosure, the electronic device 101 may access the server device 202 through a server based computing (SBC) access network 110, or may access the server device 202 through a general access network 120. For example, the electronic device 101 may access the server device 202 through the SBC access network 110. In this case, the electronic device 101 may have a authority to access data having a personal information property among user data stored in a database of the server device 202. For example, the electronic device 101 passing through the SBC access network 110 may obtain a personal information reader role.

According to an embodiment of the disclosure, the electronic device 101 may access the server device 202 through the general access network 120. In this case, the electronic device 101 cannot have the authority to access the data having the personal information property among the user data stored in the database of the server device 202. In case that the electronic device 101 passing through the general access network 120 requests an inquiry of the data having the personal information property, the request may be rejected. Thus, the electronic device 101 that wishes to perform data analysis using user data including the personal information property may be forced to pass through the SBC access network 110.

In the above-described embodiment of the disclosure, the electronic device 101 is illustrated as accessing the server device 202 based on logical network separation of a SBC method using the SBC access network 110 and the general access network 120, but is not limited thereto. According to various embodiments of the disclosure, the electronic device 101 may separate a first operating system (OS) driving a local access network capable of accessing data corresponding to the personal information property among the user data stored in the database of the server device 202 of the inside of the electronic device 101, and a second OS driving an external access network capable of accessing remaining data excluding the data corresponding to the personal information property among the user data stored in the database of the server device 202. In other words, the electronic device 101 may use logical network separation based on a client based computing (CBC) method.

Figure 2:
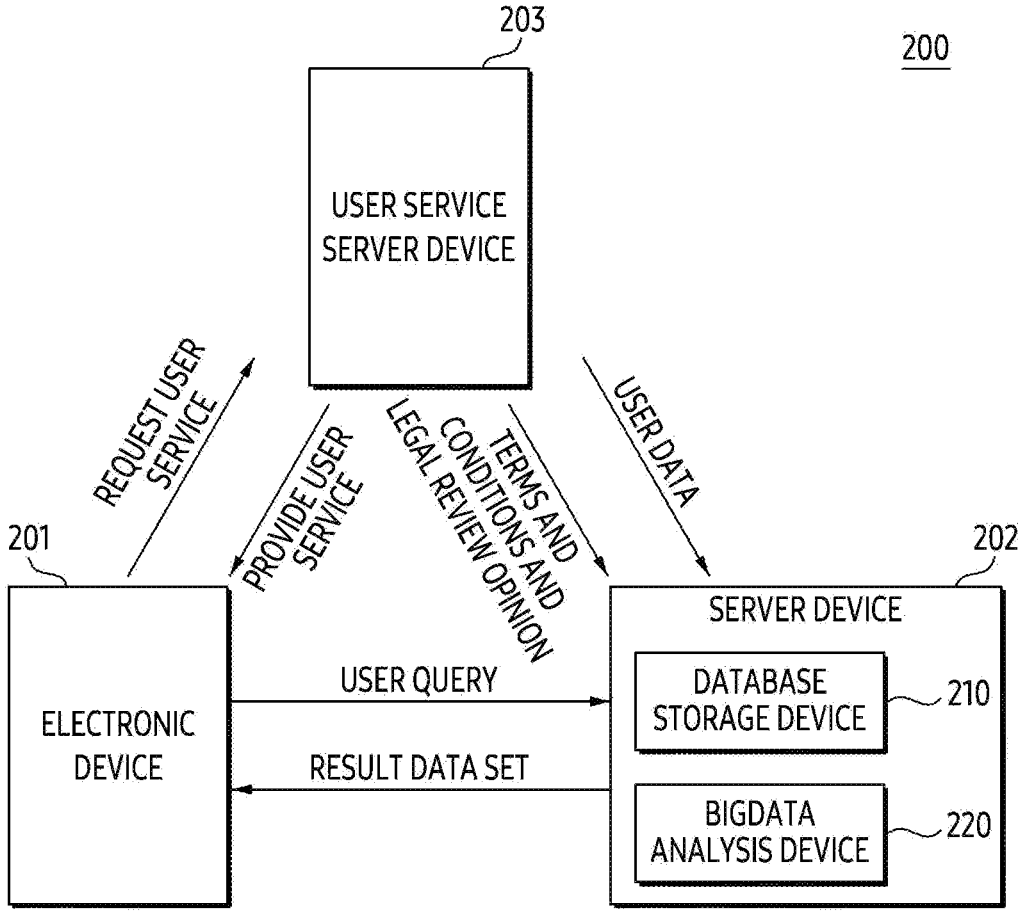
FIG. 2 illustrates a system including an electronic device and a server device according to an embodiment of the disclosure.

FIG. 2 illustrates a system including an electronic device and a server device according to an embodiment of the disclosure.

Referring to FIG. 2, a system 200 may include an electronic device 201, a server device 202, and a user service server device 203. The electronic device 201 may correspond to an electronic device 101 of FIG. 1. The server device 202 may correspond to a server 108 of FIG. 1.

According to an embodiment of the disclosure, the electronic device 201 may transmit a user query to the server device 202. The user query may refer to a set of language requesting specific data of a condition desired by a client (e.g., the electronic device 201) among data stored in the server device 202. For example, the user query may be based on a structured query language (SQL) for managing and processing data in a database system (DBMS).

According to an embodiment of the disclosure, the server device 202 may output a result data set, by processing the user query. The result data set may correspond to a set of data that satisfies the condition desired by the client among data stored in the database.

According to an embodiment of the disclosure, the server device 202 may include a database storage device 210. The database storage device 210 may include raw data for user data obtained in the service provision process and a database that converts and manages the raw data into a common format. In addition, the database storage device 210 may include data for complying with personal information protection. For example, the database storage device 210 may include information on a revision history of legal terms and conditions related to personal information processing. The database storage device 210 may include information on a review result of the legal terms and conditions. The information on the revision history of the legal terms and conditions or the information on the review result may be stored as metadata.

According to an embodiment of the disclosure, the server device 202 may include a bigdata analysis device 220. The big data analysis device 220 may determine whether there is a possibility of a personal information protection violation of the user query, by receiving the user query. For example, the bigdata analysis device 220 may decompose the user query into a plurality of sub-queries and may determine the possibility of the personal information protection violation based on a reference factor of the sub-queries. In case that it is identified that at least one sub-query among the sub-queries is likely to violate personal information protection, the bigdata analysis device 220 may convert the user query into a reconstruction query independent of personal information. For example, in case that, among the sub-queries, a sub-query that includes an analytic function that uses a column corresponding to the personal information as a key for partitioning exists, the bigdata analysis device 220 may reconstruct the sub-query to refer to a nested structure table restructured by denormalization according to the column corresponding to the personal information. For another example, the bigdata analysis device 220 may select a column corresponding to the personal information among the plurality of sub-queries, or may identify a sub-query including an aggregation function using the column corresponding to the personal information as a dimension. In this case, the bigdata analysis device 220 may control to delegate the aggregate operation, by generating an aggregation function having a authority to access the column corresponding to the personal information. The aggregation function having the authority to access may be referred to as an authorized aggregation function. A detailed configuration of the database storage device 210 and the bigdata analysis device 220 included in the server device 202 will be described later.

According to an embodiment of the disclosure, the user service server device 203 may provide information related to a user service to the server device 202. The user service may include at least a CS counseling service and a user customized advertisement service. According to an embodiment of the disclosure, the information related to the user service may include user data obtained in the process of providing the user service. For example, the user data obtained in the process of providing the user service may include information for identifying a user who requested the CS counseling. The information for identifying the user may include at least a device identifier (DEVICE_ID) and a user identifier (USER_ID). For another example, the user data obtained in the process of providing the user service may include information for providing the user customized advertisement service. The information for providing the user customized advertisement service may include at least the user identifier (USER_ID), a purchase product (BUY_PRODUCT), a purchase industry (BUSINESS_CATEGORY), and a purchase history (BUY_HISTORY). In other words, the user service server device 203 may provide the user data obtained in the process of providing the user service to the server device 202. The user data may be used to analyze the user data by the bigdata analysis device 220, by being stored in the database storage device 210.

According to an embodiment of the disclosure, the information related to the user service may include terms and conditions information on the user service and legal review opinion information. For example, the terms and conditions information may include content of terms and conditions in which the user has agreed to receive the CS counseling service and content of terms and conditions in which the user has agreed to receive the user customized advertisement service. The user service server device 203 may provide the terms and conditions information for each of a plurality of services that may be provided to the user to the server device 202. The legal review opinion information may include information for preventing violations of personal information protection laws. For example, the bigdata analysis device 220 may combine and analyze user data obtained respectively through different user services. Combining and analyzing user data that is not based on the legal review opinion may violate the personal information protection laws. For example, in case that combining and analyzing the user data obtained through user customized advertisement service and the CS counseling service, a phone number among the user data obtained through the CS counseling service may be used for the combining and analyzing, but using the device identifier (DEVICE_ID) for the combining and analyzing may cause a violation of the law. In this case, the legal review opinion information may include information for instructing the device identifier (DEVICE_ID) among the user data to be excluded from available information when combining the CS counseling service and the user customized advertisement service. In other words, the user service server device 203 may provide the user data obtained in the process of providing the user service to the server device 202. The user data may be used to analyze the user data by the bigdata analysis device 220, by being stored in the database storage device 210.

Figure 3:
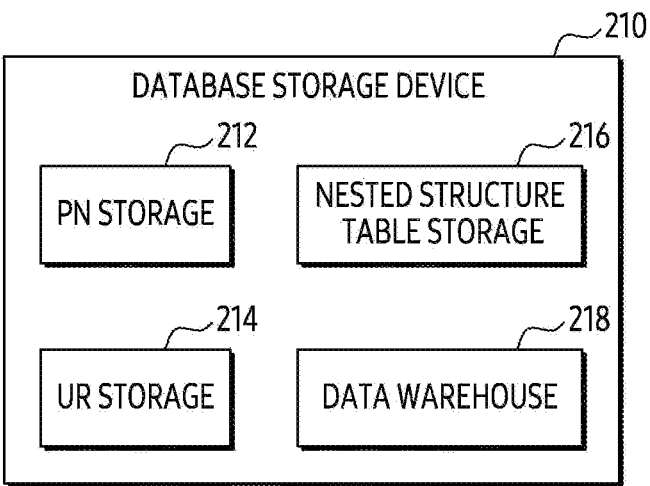
FIG. 3 is a simplified block diagram of a database storage device according to an embodiment of the disclosure.

FIG. 3 is a simplified block diagram of a database storage device according to an embodiment of the disclosure.

Referring to FIG. 3, a database storage device 210 may include a privacy notice (PN) storage 212, a user right (UR) storage 214, a nested structure table storage 216, and a data warehouse 218.

According to an embodiment of the disclosure, the PN storage 212 may include at least information on terms and conditions for complying with personal information protection, information on revision history of the terms and conditions, information on the law of personal information protection, and information on a legal review opinion on the law. For example, the PN storage 212 may include history information managing history of a personal information processing policy notified to the user for each service type. According to an embodiment of the disclosure, the PN storage 212 may store the information as metadata. For example, the PN storage 212 may store terms and conditions for complying with personal information protection for each service type and legal review opinions for each of the terms and conditions as metadata.

According to an embodiment of the disclosure, the UR storage 214 may store metadata for managing a user right requested for each service. For example, the UR storage 214 may store a user right requested for a first service as first right information. The UR storage 214 may store a user right requested for a second service as second right information. According to an embodiment of the disclosure, the first right information may be different from the second right information each other. For example, the user may request a processing restriction right for the first service and may not request the processing restriction right for the second service. The processing restriction right may be a right that may be requested to limit use but withhold deletion, in case that it is necessary to preserve for evidence for accuracy of personal information and legality of processing. In other words, the UR storage 214 may store the right to personal information requested by the user for each service as metadata.

According to an embodiment of the disclosure, the database storage device 210 may include the nested structure table storage 216. The nested structure table storage 216 may refer to a table in which a plurality of tables containing user data are restructured based on a pre-designated column. The pre-designated column may refer to at least one column among a plurality of columns having personal information property. For example, the nested structure table storage 216 may store a table in which the raw data is restructured based on a user ID (USER_ID), and may store a table in which the raw data is restructured according to the device identifier (DEVICE_ID). The device identifier (DEVICE_ID) may include at least one of an international mobile equipment identity (IMEI), a mobile equipment identifier (MEID), an electronic serial number (ESN), a pseudo ESN (pESM), a serial number, a media access control (MAC) address, and a universally unique identifier (UUID). In addition, the nested structure table storage 216 may store a table restructured again according to the device identifier (DEVICE_ID) after restructuring the raw data according to the user ID (USER_ID).

According to an embodiment of the disclosure, the database storage device 210 may include a data warehouse 218. The data warehouse 218 may store a special type of database used for data analysis by processing raw data including the user data. For example, the data warehouse 218 may further include a personal information property tag management module (not illustrated). The data warehouse 218 may tag the collected user data according to columns corresponding to the personal information property.

Figure 4:
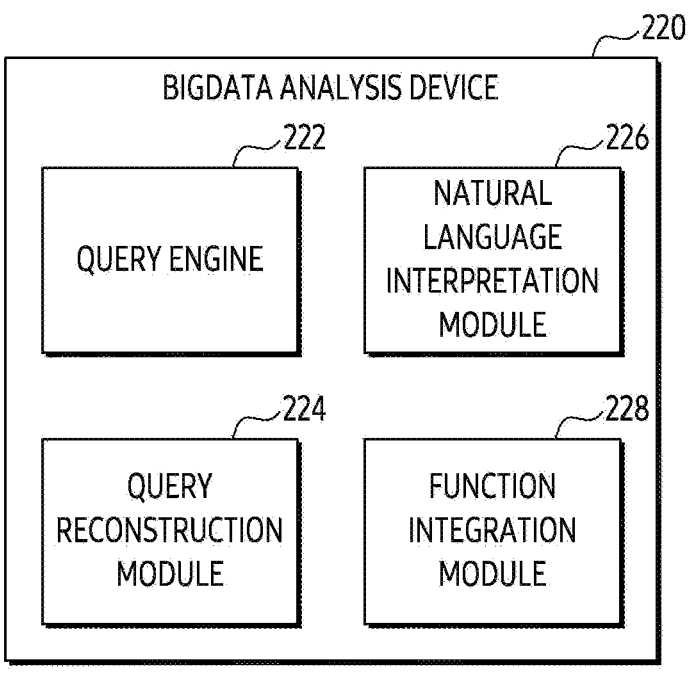
FIG. 4 is a simplified block diagram of a bigdata analysis device according to an embodiment of the disclosure.

FIG. 4 is a simplified block diagram of a bigdata analysis device according to an embodiment of the disclosure.

Referring to FIG. 4, the bigdata analysis device 220 may include a query engine 222, a query reconstruction module 224, a natural language interpretation module 226, and a function integration module 228.

According to an embodiment of the disclosure, the query engine 222 may perform a final query converted from a user query by the query reconstruction module 224. The query engine 222 may output a result data set as a result of performing the final query. The result data set may include data of a condition requested by the user query. The query engine 222 according to an embodiment may perform a final query reconstructed from the query reconstruction module 224 so that there is no risk of infringement of personal information.

According to an embodiment of the disclosure, the query reconstruction module 224 may convert the user query. The query reconstruction module 224 may determine conversion of the user query in response to identifying that the user query queries a column of the personal information property, includes an aggregation function that uses the column of the personal information property as a dimension, or includes an analytic function that uses the column of the personal information property as a key for partitioning. For example, the query reconstruction module 224 may decompose the user query into a plurality of sub-queries and may identify at least one sub-query including the analytic function among the decomposed sub-queries. In case that the analytic function included in the at least one sub-query corresponds to an analytic function that partitions based on the column having the personal information property, the query reconstruction module 224 may reconstruct the sub-query from the nested structure table storage 216 to refer to the nested structure table. The nested structure table may be a table reorganized based on a column corresponding to a personal information property set as a partitioning key by the analytic function. For another example, the query reconstruction module 224 may decompose the user query into the plurality of sub-queries and may identify at least one sub-query including an aggregation function among the decomposed sub-queries. In case that the aggregation function included in the at least one sub-query is a function using the column having the personal information property as a reference factor, the query reconstruction module 224 may generate an authorized aggregation function through the function integration module 228 and may delegate execution to the authorized aggregation function.

The natural language interpretation module 226 may generate sub-queries for filtering conditions based on metadata for legal terms and conditions and a legal review opinion of the terms and conditions. Although not illustrated, the natural language interpretation module 226 may further include a PN interpreter (not illustrated) and a UR interpreter (not illustrated) that receives metadata from a PN storage 212 and a UR storage 214 and generates a rule based on the metadata. The natural language interpretation module 226 may further include a condition generator (not illustrated) that generates a predicate in a query from the rule generated through the PN interpreter (not illustrated) and the UR interpreter (not illustrated). For example, the terms and conditions (consent_version) for providing a service may be revised to add content that agrees to a combination analysis with another service. Terms and conditions before revision may be 'version1', and terms and conditions after revision may be 'version2'. Since the natural language interpretation module 226 must perform the combination analysis with the other service only for a user who agreed to the terms and conditions after the revision, it may generate a condition statement corresponding to the WHERE clause performing the filtering condition. The WHERE clause is a condition statement injected into the reconstruction query and may indicate the filtering condition. The natural language interpretation module 226 may generate sub-queries for the filtering conditions based on metadata on a scope of a user right. For example, in case that the natural language interpretation module 226 receives metadata instructing that a processing restriction right of the user is activated from the UR storage 214, it may generate sub-queries of filtering conditions to prevent changes in user data.

The function integration module 228 may be a module for generating a function that performs an operation of an aggregation function referring to the personal information property instead. The function that performs the operation instead may be referred to as the authorized aggregation function. The authorized aggregation function may have an access authority to the column corresponding to the personal information property. The bigdata analysis device 220 may perform an aggregate operation instead through the authorized aggregation function generated through the function integration module 228, and may prevent direct reference to the personal information property by obtaining the performance result in a form of a sub-query. For example, the authorized aggregation function may be similar to a setuid that grants special authority in a Unix-based operating system (e.g., Linux). According to various embodiments of the disclosure, the function integration module 228 may perform natural language processing based on a neural network. The neural network may include various types of models, such as convolution neural network (CNN) region proposal network (RPN), recurrent neural network (RNN), and stacking-based deep neural network (S-DNN), state-space dynamic neural network (S-SDNN), deconvolution network, deep belief network (DBN), restricted Boltzman machine (RBM), fully convolutional network, and the like, such as GoogleNet, AlexNet, and VGG network, region with convolution neural network (R-CNN), but is not limited thereto.

FIG. 5 is a flowchart illustrating a method for operating a bigdata analysis device according to an embodiment of the disclosure.

Referring to FIG. 5, in operation 500, the bigdata analysis device 220 may generate and store nested structure tables in which tables including columns of a personal information property are restructured according to the personal information property based on a collected user data. Referring to FIG. 2 together, the bigdata analysis device 220 may receive user data obtained in a process of providing a user service from a user service server device 203. The user data may be a table including both data corresponding to the personal information property and data not corresponding to the personal information property. The bigdata analysis device 220 may restructure the table into the nested structure table in response to receiving the table of the user data including the data corresponding to the personal information property. For example, in case that a key of partitioning of an analytic function directly refers to the column corresponding to the personal information property, the nested structure table in which the table is restructured according to the key of the partitioning may be generated and stored in a nested structure table storage 216. Specifically, the bigdata analysis device 220 may generate and manage a restructured nested structure table by inversely normalizing the table structure of the received user data based on columns corresponding to the personal information property so that aggregation by an analytic function that does not have the personal information property may be performed by converting the sub-query to refer to the nested structure table. The nested structure table may be provided in a form of a view.

In operation 505, the bigdata analysis device 220 may convert and store collected information on terms and conditions and information on a legal review opinion into metadata for generating a condition statement to be injected into the sub-query through natural language analysis. Referring to FIG. 2 together, the bigdata analysis device 220 may receive pre-provided terms and conditions for the user service and legal review opinion information on the terms and conditions from the user service server device 203. The bigdata analysis device 220 may convert the terms and conditions information and the legal review opinion information into the metadata by using a natural language interpretation module 226. The metadata may be used to generate a condition statement to be injected into a reconstruction query.

In operation 510, the bigdata analysis device 220 may receive the user query from an electronic device 201. The electronic device 201 may correspond to an electronic device 101 of FIG. 1. The bigdata analysis device 220 may provide the user query to the query reconstruction module 224 of the bigdata analysis device 220 in order to determine whether the user query is based on the column of the personal information property. For example, the user query received by the query reconstruction module 224 may correspond to a table below.

TABLE 1

SELECT cnt AS dvc_cnt, COUNT(*) cnt FROM ( SELECT guid, category,
COUNT(DISTINCT device_id) AS cnt FROM customer_service_table1 t1
JOIN customer_service_table2 t2 ON t1.guid = t2.guid GROUP BY guid In operation 520, the bigdata analysis device 220 may decompose the user query into a plurality of sub-queries. In case that the user query based at least on the column of the personal information property is submitted and executed to a query engine 222, personal information protection violation may be caused. The query reconstruction module 224 may decompose the user query into the plurality of sub-queries. For example, the plurality of sub-queries may include at least some of sub-queries including an analytic function and sub-queries including an aggregation function. Referring to Table 1, the query reconstruction module 224 may identify that guid and device_id that is a column corresponding to the personal information property are directly referenced, and may identify that it is to be decomposed into sub-queries, by analyzing the user query. In operation 530, the bigdata analysis device 220 may identify first sub-queries referring to personal information among the plurality of sub-queries. According to an embodiment of the disclosure, the plurality of sub-queries may include sub-queries that include the analytic function. The query reconstruction module 224 may identify a column that is a criterion (e.g., key) for partitioning of the analytic function. The column that is the criterion for partitioning of the analytic function may have the personal information property. For example, in case that the column that is the criterion for partitioning corresponds to information (e.g., resident registration number, name, jurisdiction of residence, user ID, and the like.) that may identify the user, the column having the personal information property is directly referred to, so it may violate a law for personal information protection. According to an embodiment of the disclosure, the plurality of sub-queries may include sub-queries that include the aggregation function. For example, in case that a reference factor of the sub-query containing the aggregation function of the SELECT clause or a reference factor of the sub-query containing the aggregation function of the GROUP BY clause corresponds to the column having privacy property, because a result of the sub-query still has personal information property corresponding to the reference factor, it may violate the law for the personal information protection. Accordingly, the query reconstruction module 224 may identify the first sub-queries referring to personal information from among the plurality of sub-queries.

In operation 540, the bigdata analysis device 220 may convert the first sub-queries into second sub-queries that are independent of personal information. The query reconstruction module 224 may re-write the first sub-queries into the second sub-queries based on a component accessible to the personal information. According to an embodiment of the disclosure, the first sub-queries may correspond to sub-queries including the analytic function. The violation of the law may be caused based on that the column of the criterion partitioned by the analytic function has a personal information property. Thus, the query reconstruction module 224 may request a nested structure table reorganized according to the column having the property of the personal information, to the database storage device 210. For example, the column partitioned by the analytic function may be a column of a user grade. Information on the user grade may correspond to the personal information property. The query reconstruction module 224 may request a nested structure table reorganized according to the user grade column to the database storage device 210, and may refer to the nested structure table reorganized according to the user grade column. In this case, since the bigdata analysis device 220 does not group by directly referring to the column of the user grade, possibility of a personal information protection violation may be eliminated. According to an embodiment of the disclosure, the first sub-queries may correspond to the sub-queries including the aggregation function. In case that the reference factor of the aggregation function is the column having the personal information property, a violation of the law for the personal information protection may be caused. Accordingly, the query reconstruction module 224 may generate a sub-query including an authorized aggregation function, by using the function integration module 228. For example, the reference factor of the aggregation function may be the column of the user grade. The query reconstruction module 224, since the result of the sub-query includes information on user grade, may generate the authorized aggregation function through the function integration module 228 to avoid this. The authorized aggregation function may be a function for delegating the performance of the aggregation function using the column of the user grade as the reference factor. The query reconstruction module 224 may provide only the context in which the sub-query including the authorized aggregation function is required to perform the aggregation, without directly referring to the column of the personal information property.

In operation 550, the bigdata analysis device 220 may generate the reconstruction query by merging the remaining sub-queries excluding the first sub-queries and the second sub-queries among the plurality of sub-queries. Among the plurality of sub-queries, the remaining sub-queries excluding the first sub-queries may be sub-queries independent of the column corresponding to the personal information property. Thus, the reconstruction query generated by the bigdata analysis device 220 is the thing that the remaining sub-queries independent of the column corresponding to the personal information and the second sub-queries indirectly referring to the column corresponding to the personal information are merged, so it may block the possibility of the violation of the law for the personal information protection.

Figure 6:
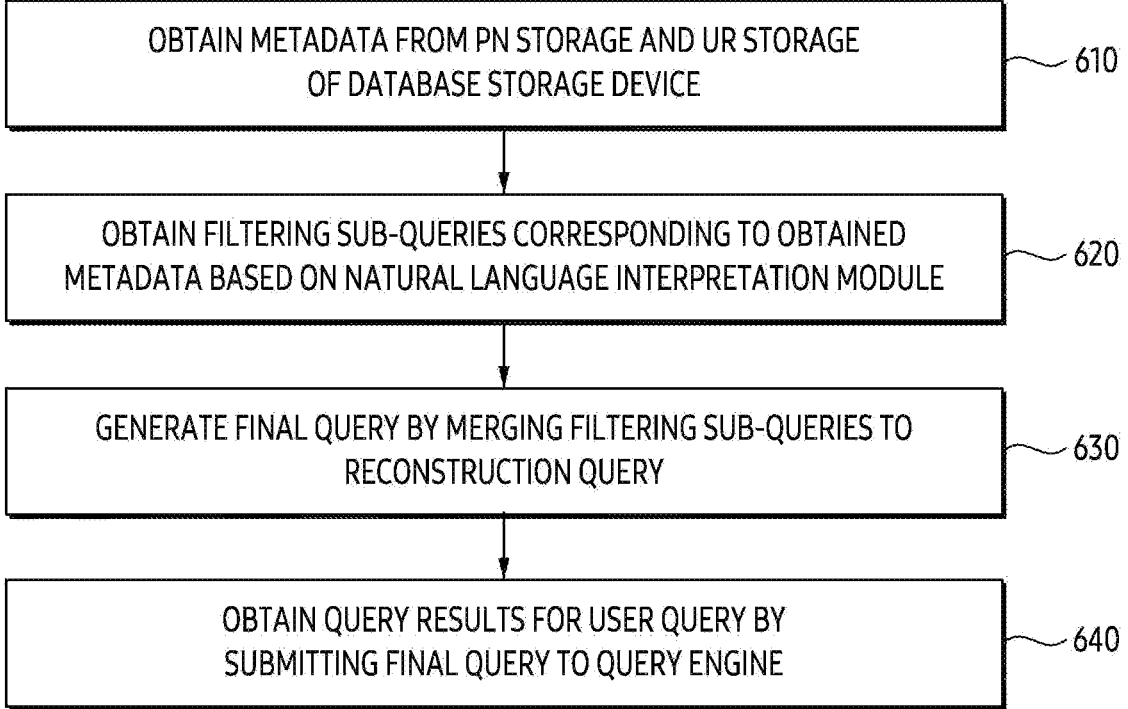
FIG. 6 is a flowchart illustrating a method for operating a bigdata analysis device according to an embodiment of the disclosure.

FIG. 6 is a flowchart illustrating a method for operating a bigdata analysis device according to an embodiment of the disclosure.

Referring to FIG. 6, in operation 610, the bigdata analysis device 220 may obtain metadata from a PN storage 212 and a UR storage 214 of the database storage device 210. For example, the PN storage 212 may include metadata for revision history and a revise opinion of legal terms and conditions related to personal information processing. The UR storage 214 may store metadata for managing a user right requested for each service.

In operation 620, the bigdata analysis device 220 may obtain filtering condition statements corresponding to the obtained metadata based on a natural language interpretation module 226. The condition statements may be configured to perform the filtering by being injected into a reconstruction query. The natural language interpretation module 226 may generate sub-queries for filtering conditions based on metadata received from the PN storage 212 and the UR storage 214. For example, the terms and conditions (consent_version) for providing a service may be revised to add content that agrees to a combination analysis with another service. Terms and conditions before revision may be 'version1', and terms and conditions after revision may be 'version2'. Since the natural language interpretation module 226 must perform the combination analysis with the other service only for a user who agreed to the terms and conditions after the revision, it may generate a condition statement of the WHERE clause performing the filtering condition. For another example, when a user of an electronic device 101 wants to perform a combination analysis with an existing service and another service (e.g., customer counseling services), the laws of Country A that is one of the countries that provide the above other service, may only be used for counseling history information provided after 201B, and may be changed to allow only a phone number and an e-mail addresses to be used when searching user information. In this case, the natural language interpretation module 226 may generate sub-queries for limiting that timing of the counseling history information is after 201B as first filtering condition and for limiting information that can be viewed is limited to phone numbers and e-mails as a second filtering condition.

In operation 630, the bigdata analysis device 220 may generate a final query by injecting the condition statement of the WHERE clause for the filtering into the reconstruction query. For example, a final query generated by the query reconstruction module 224 may be as the table below.

TABLE 2

SELECT cnt AS dvc_cnt, COUNT(*) cnt FROM ( SELECT
authorized_count('COUNT_DISTINCT', -- aggregation function['guid', 'category'],
-- dimension 'device_id' -- metric FROM customer_service_table1_table_2_nested
WHERE consent_version = 'version2')

Referring to Table 2 above, it can be seen that the natural language interpretation module 226 generates the condition statement of the WHERE clause and injects (or adds) the generated condition statement at the end of the reconstruction query in order to limit it to users who agreed to the terms and conditions after the revision. Since the final query is limited to a case where the conditions (consent_version) for providing the service is the conditions (version2) after the revision, it is possible to block a possibility of a violation of personal information protection by performing a combination analysis on a user of the conditions (version1) before the revision. In operation 640, the bigdata analysis device 220 may obtain a result data set for the user query by injecting the final query into a query engine 222. Referring to FIGS. 5 and 6, the query reconstruction module 224 may block the possibility of the violation of the law for personal information protection by generating the reconstruction query by converting sub-queries based at least on a column having property of personal information into equivalent sub-queries that do not directly refer to the column. In addition, the query reconstruction module 224 generates a condition statement for performing filtering based on the UR storage 214 and the PN storage 212 and generates the final query by injecting the generated condition statement into the reconstruction query, thereby blocking a possibility of a personal information protection violation that may occur due to changes in the terms and conditions or revisions to the law. For example, for a combination analysis with the other service, the WHERE clause is automatically injected as the filtering condition in the process of combining a table of the other service, the user may obtain a result data set without any risk of personal information infringement without any extra effort in the data analysis process.

FIG. 7 is a flowchart illustrating a method for operating a query reconstruction module reconstructing second sub-queries according to an embodiment of the disclosure.

Referring to FIG. 7, in operation 710, the query reconstruction module 224 may identify analytical queries among first sub-queries. The analytical query may refer to a sub-query including an analytic function.

In operation 720, the query reconstruction module 224 may identify whether the analytical queries use partitioning based on personal information. The query reconstruction module 224 may identify a property of a column corresponding to a key of a partitioning for the analytic function. According to an embodiment of the disclosure, in case that a column corresponding to a key of a partitioning for the analytical query does not correspond to the personal information property, existence of an aggregate query using the personal information property as a reference factor may be determined. The aggregate query may refer to a sub-query including an aggregation function. In case that the partitioning key for each of the analytical queries do not all correspond to the personal information property, a result of the analytical queries do not correspond to the personal information property as well. Accordingly, operation 750 may be performed to perform only the determination on the reference factor of the aggregate query. According to an embodiment of the disclosure, in case that the column corresponding to the partitioning key for the analytical query corresponds to the personal information property (e.g., the partitioning key is a user ID (USER_ID), and in case that the analytical query is performed through a query engine 222, the result of the analytical queries may include the personal information property as it is.

In operation 730, the query reconstruction module 224 may converts the analytical queries into aggregate queries to refer to a nested structure table in which partitioning based on the personal information has been completed, and may merge the aggregate queries converted in operation 740 with the remaining sub-queries excluding the analytical query identified among first sub-queries. For example, referring back to Table 1 above, a user query may directly refer to guid and device_id that are a column corresponding to the personal information property. The query reconstruction module 224 may combine guid referring to the same column based on the GROUP BY clause.

According to a comparison example, the database storage device 210 may perform denormalization by combining a table 1 of a first service and a table 2 of a second service through the JOIN clause in order to combine the same column (guid) according to the GROUP BY clause. The denormalization table may correspond to the Table below.

TABLE 3

| guid | device_id | device_type |
|---|---|---|
| abc123 | 111111 | Mobile |
| abc123 | 222222 | Mobile |
| abc123 | 333333 | Airconditioner |
| xyz987 | 444444 | Mobile |
| xyz987 | 555555 | TV |
| xyz987 | 666666 | TV |

According to a comparison example, in case that the query reconstruction module 224 refers to the denormalization table, rows having the same guid value may be generated as a group by comparing content of the guid column while executing the GROUP BY clause. However, for this purpose, a guide column having the personal information property is referenced, so the law for personal information protection may be violated. According to an embodiment of the disclosure, the database storage device 210 may generate and store the nested structure table based on the guid column. The nested structure table based on the guid may correspond to the Table below.

TABLE 4

| guid | device_id | device_type |
|---|---|---|
| abc123 | 111111 | Mobile |
| | 222222 | Mobile |
| | 333333 | Airconditioner |
| xyz987 | 444444 | Mobile |
| | 555555 | TV |
| | 666666 | TV |

In case of referring to the nested structure table based on the guid column, the query reconfiguration module 224 may estimate that the group is divided based on the guid even if there is no GROUP BY clause, so that the GROUP BY clause may be deleted. Referring back to Table 1, in case of the JOIN clause, it may be identified that the guid column value corresponding to the partitioning key of Table 1 and Table 2 is being compared in the ON clause. However, in case that the guid column value is referenced for comparison of the guid column value, the violation of the law for personal information protection may occur. According to an embodiment of the disclosure, the combining by the JOIN clause may be removed by referring to the nested structure table, as in the GROUP BY clause of the guid column above. In this case, the generated nested structure table may have a form of an authorized view, and thus additional overhead may not occur in generating the nested structure table. The result of removing sub-queries referring to the column corresponding to the personal information property through operations 730 to 740 may correspond to the Table below.

TABLE 5

SELECT cnt AS dvc_cnt, COUNT(*) AS cnt FROM ( SELECT guid, category,
COUNT(DISTINCT device_id) AS cnt FROM
customer_service_table1_table_2_nested Referring to Table 5, the JOIN clause and the ON clause referring to the guide column in the GROUP BY clause may be removed by referring to the nested structure table (customer_service_table1_table2_nested). In operation 750, the query reconstruction module 224 identify whether an aggregate query that refers to personal information among the merged aggregate queries exists. Referring back to Table 5, the query reconstruction module 224 may identify the reference factor for each aggregation function including the SELECT clause. In Table 5 above, an aggregation function including the SELECT clause that directly refers to the guid column and the device_id column may cause a violation of the law of personal information protection. Accordingly, the query reconstruction module 224 may determine that an aggregate query referring to personal information exists.

In operation 760, the query reconstruction module 224 may generate a reconstruction query including an authorized aggregation query having authority for the personal information referenced through the function integration module 228. According to an embodiment of the disclosure, the function integration module 228 may generate the authorized aggregation query in response to a request from the query reconstruction module 224. The authorized aggregation query may be a sub-query including an aggregation function having access authority for a column corresponding to the personal information property. Referring to Table 5, an aggregation function including the SELECT clause that directly refers to the guid column and the device_id column may avoid a possibility of a personal information violation by delegating a query to the authorized aggregation query. For example, the authorized aggregation query may perform aggregation, as a metric, the guid column corresponding to the personal information property and the device_id column corresponding to the personal information property according to a dimension of the category. The reconstruction query generated through operation 760 may correspond to the table below.

TABLE 6

SELECT cnt AS dvc_cnt, COUNT(*) cnt FROM ( SELECT
authorized_count('COUNT_DISTINCT',['guid', 'category'], 'device_id' FROM
customer_service_table1_table_2_nested Referring to Table 6, a sub-query changed to use the authorized aggregation function may delegate execution to the dynamically generated authorized aggregation function without directly referring to the guide column and the device_id column having the personal information property. The changed sub-query may receive a result from the authorized aggregation function in a form of a sub-query. A method for operating a bigdata analysis device according to an embodiment as described above may comprise receiving a user query, decomposing the received user query to a plurality of sub-queries, identifying first sub-queries configured to refer to personal information among the plurality of sub-queries, based on a component accessible to the personal information, reconstructing the first sub-queries into second sub-queries independent of the personal information, and generating a reconstruction query by merging the second sub-queries and remaining sub-queries excluding the first sub-queries configured to refer to the personal information among the plurality of sub-queries.

According to an embodiment of the disclosure, the method for operating the bigdata analysis device may further comprise generating filtering conditions related to the personal information, generating a final query by adding the generated filtering conditions to the reconstruction query, and obtaining data for analysis results of big data by injecting the final query into the query engine.

According to an embodiment of the disclosure, the filtering conditions may comprise conditions to prevent violations of laws related to the personal information and conditions to not exceed a scope of user consent related to the personal information.

According to an embodiment of the disclosure, the first sub-queries may comprise analytical queries using an analytic function including partitioning based on the personal information, and aggregate queries using aggregation functions that do not include partitioning based on the personal information.

According to an embodiment of the disclosure, reconstructing into the second sub-queries may further comprise identifying the analytical queries among the first sub-queries, and converting the analytical queries by referring to a nested table containing data pre-partitioned based on the personal information, and wherein the component accessible to the personal information may correspond to the nested table.

According to an embodiment of the disclosure, reconstructing into the second sub-queries may further comprise identifying sub-queries which refer to the personal information among the converted analytical queries and the aggregate queries, converting into sub-queries that provide context for the personal information through an authorized aggregation function that delegates execution of the identified sub-queries, and merging the sub-queries converted to provide the context and the remaining sub-queries excluding the first sub-queries configured to refer to the personal information among the plurality of sub-queries, and wherein the component accessible to the personal information may correspond to the authorized aggregation function.

According to an embodiment of the disclosure, the filtering conditions may include sub-queries obtained by converting natural language indicating information on laws related to the personal information and information on the scope of user consent related to the personal information based on an artificial intelligence (AI) model.

According to an embodiment of the disclosure, the personal information may correspond to information accessible through a separate network that is distinct from the network to which the big data analysis device is connected.

According to an embodiment of the disclosure, the nested table may correspond to a table which is reconstructed from a table containing the big data based on each data representing a property of the personal information among the big data.

A bigdata analysis device according to an embodiment as described above may comprise a query interface to receive user input, query reconstruction module to decompose a query into sub-queries or merge sub-queries, a query engine for performing operations on requested queries and outputting result data, and natural language interpretation module that generates sub-queries for filtering conditions, and wherein the bigdata analysis device may be configured to receive, through the query interface, a user query, decompose the received user query to a plurality of sub-queries, identify, through the query reconstruction module, first sub-queries configured to refer to personal information among the plurality of sub-queries, based on a component accessible to the personal information, reconstruct, through the query reconstruction module, the first sub-queries into second sub-queries independent of the personal information, and generate, through the query reconstruction module, a reconstruction query by merging the second sub-queries and remaining sub-queries excluding the first sub-queries configured to refer to the personal information among the plurality of sub-queries.

According to an embodiment of the disclosure, the big-data analysis device may be configured to, after generating filtering conditions related to the personal information, provide, through the natural language interpretation module, the generated filtering conditions to the query reconstruction module, generate, through the query reconstruction module, a final query by adding the generated filtering conditions to the reconstruction query, and obtain, through the query engine, data for a analysis result corresponding to the final query.

According to an embodiment of the disclosure, the filtering conditions may comprise conditions to prevent violations of laws related to the personal information and conditions to not exceed a scope of user consent related to the personal information.

According to an embodiment of the disclosure, the first sub-queries may comprise analytical queries using an analytic function including partitioning based on the personal information, and aggregate queries using aggregation functions that do not include partitioning based on the personal information.

According to an embodiment of the disclosure, the query reconstruction module may be configured to identify the analytical queries among the first sub-queries, and convert the analytical queries by referring to a nested table containing data pre-partitioned based on the personal information, and wherein the component accessible to the personal information may be configured to correspond to the nested table.

According to an embodiment of the disclosure, the query reconstruction module may be configured to identify sub-queries which refer to the personal information among the converted analytical queries and the aggregate queries, convert into sub-queries that provide context for the personal information through an authorized aggregation function that delegates execution of the identified sub-queries, and merge the sub-queries converted to provide the context and the remaining sub-queries excluding the first sub-queries configured to refer to the personal information among the plurality of sub-queries, and wherein the component accessible to the personal information may correspond to the authorized aggregation function.

According to an embodiment of the disclosure, the filtering conditions may include sub-queries obtained by converting natural language indicating information on laws related to the personal information and information on the scope of user consent related to the personal information based on an artificial intelligence (AI) model included in the natural language interpretation module.

According to an embodiment of the disclosure, the personal information may correspond to information accessible through a separate network that is distinct from the network to which the big data analysis device is connected.

According to an embodiment of the disclosure, the nested table may correspond to a table which is reconstructed from a table containing the big data based on each data representing a property of the personal information among the big data.

Non-transitory computer readable storage medium storing one or more programs according to an embodiment as described above, when being executed by a processor of an electronic device with memory configured to store instructions for executing a query interface, query reconstruction module, a query engine, and natural language interpretation module, may be configured to receive, through the query interface, a user query, decompose, through the query reconstruction module, the received user query to a plurality of sub-queries, identify, through the query reconstruction module, first sub-queries configured to refer to personal information among the plurality of sub-queries, based on a component accessible to the personal information, reconstruct, through the query reconstruction module, the first sub-queries into second sub-queries independent of the personal information, and generate, through the query reconstruction module, a reconstruction query by merging the second sub-queries and remaining sub-queries excluding the first sub-queries configured to refer to the personal information among the plurality of sub-queries.

According to an embodiment of the disclosure, the processor, when executing the instructions, may be configured to generate filtering conditions related to the personal information, through the natural language interpretation module, generate, through the query reconstruction module, a final query by adding the generated filtering conditions to the reconstruction query, and obtain, through the query engine, data for an analysis result corresponding to the final query.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," or "connected with" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment of the disclosure, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between a case in which data is semi-permanently stored in the storage medium and a case in which the data is temporarily stored in the storage medium.

According to an embodiment of the disclosure, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments of the disclosure, each component (e.g., a module or a program) of the above-described components may include a single entity or multiple entities, and some of the multiple entities may be separately disposed in different components. According to various embodiments of the disclosure, one or more of the above-described components may be omitted, or one or more other components may be added. Alternatively or additionally, a plurality of components (e.g., modules or programs) may be integrated into a single component. In such a case, according to various embodiments of the disclosure, the integrated component may still perform one or more functions of each of the plurality of components in the same or similar manner as they are performed by a corresponding one of the plurality of components before the integration. According to various embodiments of the disclosure, operations performed by the module, the program, or another component may be carried out sequentially, in parallel, repeatedly, or heuristically, or one or more of the operations may be executed in a different order or omitted, or one or more other operations may be added.

It will be appreciated that various embodiments of the disclosure according to the claims and description in the specification can be realized in the form of hardware, software or a combination of hardware and software.

Any such software may be stored in non-transitory computer readable storage media. The non-transitory computer readable storage media store one or more computer programs (software modules), the one or more computer programs include computer-executable instructions that, when executed by one or more processors of an electronic device, cause the electronic device to perform a method of the disclosure.

Any such software may be stored in the form of volatile or non-volatile storage, such as, for example, a storage device like read only memory (ROM), whether erasable or rewritable or not, or in the form of memory, such as, for example, random access memory (RAM), memory chips, device or integrated circuits or on an optically or magnetically readable medium, such as, for example, a compact disk (CD), digital versatile disc (DVD), magnetic disk or magnetic tape or the like. It will be appreciated that the storage devices and storage media are various embodiments of non-transitory machine-readable storage that are suitable for storing a computer program or computer programs comprising instructions that, when executed, implement various embodiments of the disclosure. Accordingly, various embodiments provide a program comprising code for implementing apparatus or a method as claimed in any one of the claims of this specification and a non-transitory machine-readable storage storing such a program.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method for performed by a bigdata analysis device, the method comprising:
  receiving a user query;
  decomposing the user query into a plurality of sub-queries;
  identifying first sub-queries configured to refer to personal information among the plurality of sub-queries, the first sub-queries comprising one or more analytical queries using an analytic function including partitioning based on the personal information and one or more aggregate queries using aggregation functions that do not include partitioning based on the personal information;
  based on a processing operation configured to access the personal information, reconstructing the first sub-queries into second sub-queries independent of the personal information; and
  generating a reconstruction query by merging the second sub-queries and remaining sub-queries excluding the first sub-queries configured to refer to the personal information among the plurality of sub-queries.

2. The method of claim 1, further comprising:
  generating filtering conditions related to the personal information;
  generating a final query by adding the filtering conditions to the reconstruction query; and
  obtaining data for analysis results of big data by injecting the final query into a query engine.

3. The method of claim 2, wherein the filtering conditions comprise:
  conditions to prevent violations of laws related to the personal information; and
  conditions to not exceed a scope of user consent related to the personal information.

4. The method of claim 3, wherein the filtering conditions include:
  sub-queries obtained by converting natural language indicating information on laws related to the personal information; and
  information on the scope of user consent related to the personal information based on an artificial intelligence (AI) model.

5. The method of claim 1,
wherein the reconstructing of the first sub-queries into the second sub-queries based on the processing operation comprises:
  identifying the one or more analytical queries among the first sub-queries; and
  converting the one or more analytical queries into converted analytical queries by referring to a nested table containing data pre-partitioned based on the personal information.

6. The method of claim 5,
wherein the reconstructing of the first sub-queries into the second sub-queries based on the processing operation further comprises:
  identifying sub-queries which refer to the personal information among the converted analytical queries and the one or more aggregate queries;
  converting into sub-queries that provide context for the personal information through an authorized aggregation function that delegates execution of the sub-queries; and
  merging the sub-queries converted to provide the context and the remaining sub-queries excluding the first sub-queries configured to refer to the personal information among the plurality of sub-queries.

7. The method of claim 5, wherein the personal information corresponds to information accessible through a separate network that is distinct from a network to which the bigdata analysis device is connected.

8. The method of claim 7, wherein the nested table corresponds to a table which is reconstructed from a table containing big data based on each data representing a property of the personal information among the big data.

9. A bigdata analysis device comprising:
  a query interface;
  query reconstruction circuitry configured to decompose a query into sub-queries or merge sub-queries;
  a query engine configured to perform operations on requested queries and output result data; and
  natural language interpretation circuitry configured to generate sub-queries for filtering conditions,
  wherein the bigdata analysis device is configured to:
    receive, through the query interface, a user query,
    decompose the user query into a plurality of sub-queries,
    identify, using the query reconstruction circuitry, first sub-queries configured to refer to personal information among the plurality of sub-queries, the first sub-queries comprising one or more analytical queries using an analytic function including partitioning based on the personal information and one or more aggregate queries using aggregation functions that do not include partitioning based on the personal information,
    based on a processing operation configured to access the personal information, reconstruct, using the query reconstruction circuitry, the first sub-queries into second sub-queries independent of the personal information, and
    generate, using the query reconstruction circuitry, a reconstruction query by merging the second sub-queries and remaining sub-queries excluding the first sub-queries configured to refer to the personal information among the plurality of sub-queries.

10. The bigdata analysis device of claim 9, wherein the bigdata analysis device is further configured to:

after generating filtering conditions related to the personal information, provide, using the natural language interpretation circuitry, the filtering conditions to the query reconstruction circuitry;

generate, using the query reconstruction circuitry, a final query by adding the generated filtering conditions to the reconstruction query; and obtain, through the query engine, data for an analysis result corresponding to the final query.

11. The bigdata analysis device of claim 10, wherein the filtering conditions comprise:

conditions to prevent violations of laws related to the personal information; and conditions to not exceed a scope of user consent related to the personal information.

12. The bigdata analysis device of claim 11, wherein the filtering conditions include:

sub-queries obtained by converting natural language indicating information on laws related to the personal information; and information on the scope of user consent related to the personal information based on an artificial intelligence (AI) model.

13. The bigdata analysis device of claim 9, wherein the query reconstruction circuitry is configured to:

identify the one or more analytical queries among the first sub-queries; and convert the one or more analytical queries by referring to a nested table containing data pre-partitioned based on the personal information.

14. The bigdata analysis device of claim 13, wherein the reconstructing of the first sub-queries into the second sub-queries comprises:

identifying sub-queries referring to the personal information among the converted one or more analytical queries and the one or more aggregate queries;

converting into sub-queries that provide context for the personal information through an authorized aggregation function that delegates execution of the identified sub-queries; and merging the sub-queries converted to provide the context and the remaining sub-queries excluding the first sub-queries configured to refer to the personal information among the plurality of sub-queries.

15. The bigdata analysis device of claim 13, wherein the personal information corresponds to information accessible through a separate network that is distinct from a network to which the bigdata analysis device is connected.

16. The bigdata analysis device of claim 15, wherein the nested table corresponds to a table which is reconstructed from a table containing big data based on each data representing a property of the personal information among the big data.

17. One or more non-transitory computer-readable storage media storing computer-executable instructions that, when executed by one or more processors of an electronic device, cause the electronic device to perform operations, the operations comprising:

receiving, through a query interface, a user query;

decomposing, using query reconstruction circuitry, the user query into a plurality of sub-queries;

identifying, using the query reconstruction circuitry, first sub-queries configured to refer to personal information among the plurality of sub-queries, the first sub-queries comprising one or more analytical queries using an analytic function including partitioning based on the personal information and one or more aggregate queries using aggregation functions that do not include partitioning based on the personal information;

based on a processing operation configured to access the personal information, reconstructing, using the query reconstruction circuitry, the first sub-queries into second sub-queries independent of the personal information; and generating, using the query reconstruction circuitry, a reconstruction query by merging the second sub-queries and remaining sub-queries excluding the first sub-queries configured to refer to the personal information among the plurality of sub-queries.

18. The one or more non-transitory computer-readable storage media of claim 17, the operations further comprising:

generating filtering conditions related to the personal information;

generating a final query by adding the generated filtering conditions to the reconstruction query; and obtaining data for analysis results of big data by injecting the final query into a query engine.

* * * * *